US010126902B2

(12) United States Patent
Strong et al.

(10) Patent No.: US 10,126,902 B2
(45) Date of Patent: Nov. 13, 2018

(54) CONTEXTUAL HELP SYSTEM

(71) Applicant: SMUGMUG, INC., Mountain View, CA (US)

(72) Inventors: Brian Strong, San Jose, CA (US); Don Macaskill, Los Altos, CA (US); Angelo Robert Dinardi, Los Gatos, CA (US); Craig Andrew Murray, San Jose, CA (US)

(73) Assignee: SmugMug, Inc., Mountain View, CA (US)

( * ) Notice: Subject to any disclaimer, the term of this patent is extended or adjusted under 35 U.S.C. 154(b) by 211 days.

(21) Appl. No.: 14/912,579

(22) PCT Filed: Sep. 2, 2014

(86) PCT No.: PCT/US2014/053706
§ 371 (c)(1),
(2) Date: Feb. 17, 2016

(87) PCT Pub. No.: WO2015/034826
PCT Pub. Date: Mar. 12, 2015

(65) Prior Publication Data
US 2016/0203004 A1 Jul. 14, 2016

Related U.S. Application Data

(60) Provisional application No. 61/874,747, filed on Sep. 6, 2013.

(51) Int. Cl.
*G06F 3/048* (2013.01)
*G06F 3/0482* (2013.01)
*G06F 3/0484* (2013.01)
*G06F 9/451* (2018.01)

(52) U.S. Cl.
CPC ............ *G06F 3/048* (2013.01); *G06F 3/0482* (2013.01); *G06F 3/04842* (2013.01); *G06F 9/453* (2018.02)

(58) Field of Classification Search
CPC .. G06F 9/4446; G06F 3/04842; G06F 17/248; G06F 17/30528; G06F 17/30554; G06F 9/453; G06F 3/04817
See application file for complete search history.

(56) References Cited

U.S. PATENT DOCUMENTS

| 4,789,962 | A | 12/1988 | Berry et al. |
| 5,754,176 | A | 5/1998 | Crawford |
| 6,563,514 | B1 | 5/2003 | Samar |
| 7,814,420 | B2 | 10/2010 | Gerhart et al. |

(Continued)

OTHER PUBLICATIONS

International Search Report and Written Opinion for International Application No. PCT/US14/53706 dated Nov. 24, 2014.

*Primary Examiner* — Linh K Pham
(74) *Attorney, Agent, or Firm* — Patterson + Sheridan, LLP

(57) ABSTRACT

Embodiments described herein generally relate to a dynamic contextual help application. The help application adapts to content displayed within a graphical user interface (GUI) to provide content specific help objects. The help objects may be selected by a user and an indication object may simultaneously appear apart from the contextual help application to guide the user in performing various functions related to the selected help object.

9 Claims, 7 Drawing Sheets

(56) References Cited

U.S. PATENT DOCUMENTS

| | | | |
|---|---|---|---|
| 2002/0154153 A1* | 10/2002 | Messinger | G06F 9/453 |
| | | | 715/705 |
| 2004/0095372 A1 | 5/2004 | Berry et al. | |
| 2005/0114778 A1 | 5/2005 | Branson et al. | |
| 2006/0036991 A1 | 2/2006 | Biazetti et al. | |
| 2007/0050719 A1 | 3/2007 | Lui et al. | |
| 2007/0220428 A1* | 9/2007 | Kureshy | G06F 9/4446 |
| | | | 715/708 |
| 2009/0172516 A1 | 7/2009 | Gill | |
| 2011/0271185 A1* | 11/2011 | Chen | G06F 9/453 |
| | | | 715/708 |
| 2012/0317481 A1* | 12/2012 | Armstrong | G06F 9/4446 |
| | | | 715/707 |

* cited by examiner

CONTEXTUAL HELP SYSTEM

BACKGROUND

Field

Embodiments described herein generally relate to a method and application for providing a user with guidance in a website or software. More specifically, embodiments provided herein relate to a contextual help system.

Description of the Related Art

The Internet has gained prevalence in today's society enjoyed by few other technologies. The backbone of the Internet is the almost countless number of websites that can be accessed from the Internet by users around the world. Many businesses and individuals maintain a website for business or personal use. However, creating a website generally requires the knowledge of computer code such as HTML, Java, Javascript, C, C++, Perl, PHP, Ruby, SQL, etc. Many users lack the requisite knowledge required to build a functioning website using code in a cost effective and timely manner. Moreover, the evolution of websites has resulted in a demand from website viewers that the websites function properly and are aesthetically pleasing.

Generally, a user must hire a website designer or engineer with knowledge of computer code to construct and build a website to their desired specifications. Although the web designer or engineer may create a website that meets the specifications of the user, any subsequent changes required by the business or individual would require further revision by the website designer or engineer. Each time the user wants to make any changes to the website, they must pay for the changes which can decrease the cost-effectiveness of owning and maintaining a website. Further, for a user who updates or changes their website frequently, it would be difficult to maintain a website with current information if the user was not able to change and update the website themselves.

In addition to the challenges associated with building and maintaining a website, a user may require additional help to effectively utilize and customize a website to the user's preferences. As applications provided in websites become more complex, increased user sophistication may be required to effectively utilize a website's applications. Some users may find it necessary to take classes or study materials so that they may learn how to use the applications effectively. Other users may rely on the assistance of others to perform the desired operations within the website. However, the aforementioned reasons often inhibit a user from effectively creating or maintaining a website by themselves. Moreover, a user may not remember how to perform certain operations previously performed or whether an application of a website is capable of performing a desired operation.

Many websites include instructions or tutorials for utilizing various aspects and applications of the website. For example, a "help" selection, or link, may be provided by which may allow the user to access a large amount of information regarding troubleshooting or functionality of applications included within the website. Often, the "help" selection may redirect the user to another webpage or a new window with generalized help advice. The help advice is often contained in a single document (e.g. a condensed version of the operating guide) or separate website and the user must traverse through various unrelated troubleshooting tips or application instructions to find the relevant portion of the help advice the user needs to address their issue. The information, although potentially helpful in nature, is generally not provided in a focused and concise manner. Thus, the user may spend a large amount of time just searching for relevant help advice and may not find the necessary information at all. Further, the user may not fully utilize various aspects of the website because the user may not be aware of the functions and capabilities offered.

Therefore, what is needed in the art is an application which provides concise and relevant information for a user who is seeking to troubleshoot or utilize various functions contained within a website or software.

SUMMARY

Embodiments described herein generally relate to a dynamic contextual help application. The help application adapts to content displayed within a graphical user interface (GUI) to provide content specific help objects. The help objects may be selected by a user and an indication object may simultaneously appear apart from the contextual help application to guide the user in performing various functions related to the selected help object.

In one embodiment, a method of providing dynamic contextual help to a user is provided. The method may comprise providing a contextual help application, determining categories of content displayed by a graphic user interface, and displaying one or more objects in the contextual help application relating to the content displayed by the graphical user interface. The method may also comprise receiving input selecting the one or more objects provided in the contextual help application, wherein an indication object may be simultaneously provided within the graphical user interface where instructions relating to a selected object may be performed apart from the contextual help application.

In another embodiment, a non-transitory computer-readable storage medium may be provided. The non-transitory computer-readable storage medium may store instructions that when executed by a processor, cause the processor to provide dynamic contextual help by performing the steps of providing a contextual help application, determining categories of content displayed by a graphical user interface, and displaying one or more objects in the contextual help application relating to the content displayed by the graphical user interface. Input may also be received selecting the one or more objects provided in the contextual help application, wherein an indication object may be simultaneously provided within the graphical user interface where instructions relating to a selected object may be performed apart from the contextual help application.

In yet another embodiment, a computer system for providing dynamic contextual help is provided. The computer system may comprise a processor and a memory storing instructions that, when executed by the processor, cause the computer system to provide a contextual help application, determine categories of content displayed by a graphical user interface, and display one or more objects in the contextual help application relating to the content displayed by the graphical user interface. The computer system may also receive input selecting the one or more objects provided in the contextual help application, wherein an indication object may be simultaneously provided within the graphical user interface where instructions relating to a selected object may be performed apart from the contextual help application.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized in other embodiments without specific recitation.

DETAILED DESCRIPTION

Embodiments described herein generally relate to a dynamic contextual help application. The help application adapts to content displayed within a graphical user interface (GUI) to provide content specific help objects. The help objects may be selected by a user and an indication object may simultaneously appear apart from the contextual help application to guide the user in performing various functions related to the selected help object.

The term "user" as used herein includes, for example, a person or entity that owns a computing device or a wireless device; a person or entity that operates or utilizes a computing device or a wireless device; or a person or entity that is otherwise associated with a computing device or a wireless device. It is contemplated that the term "user" is not intended to be limiting and may include various examples beyond those described.

The term "help" as used herein includes, for example, guidance, assistance, explanations, details, and instructions provided to a user in order to assist the user to locate and/or perform a particular task or operation, or sequence of tasks or operations; textual, graphical, audible, visual, audio-visual, and animated output produced by the computer or wireless device and presented to the user as help; or other suitable types of guidance. It is contemplated that the term "help" is not intended to be limiting and may include various examples beyond those described.

Figure 1:
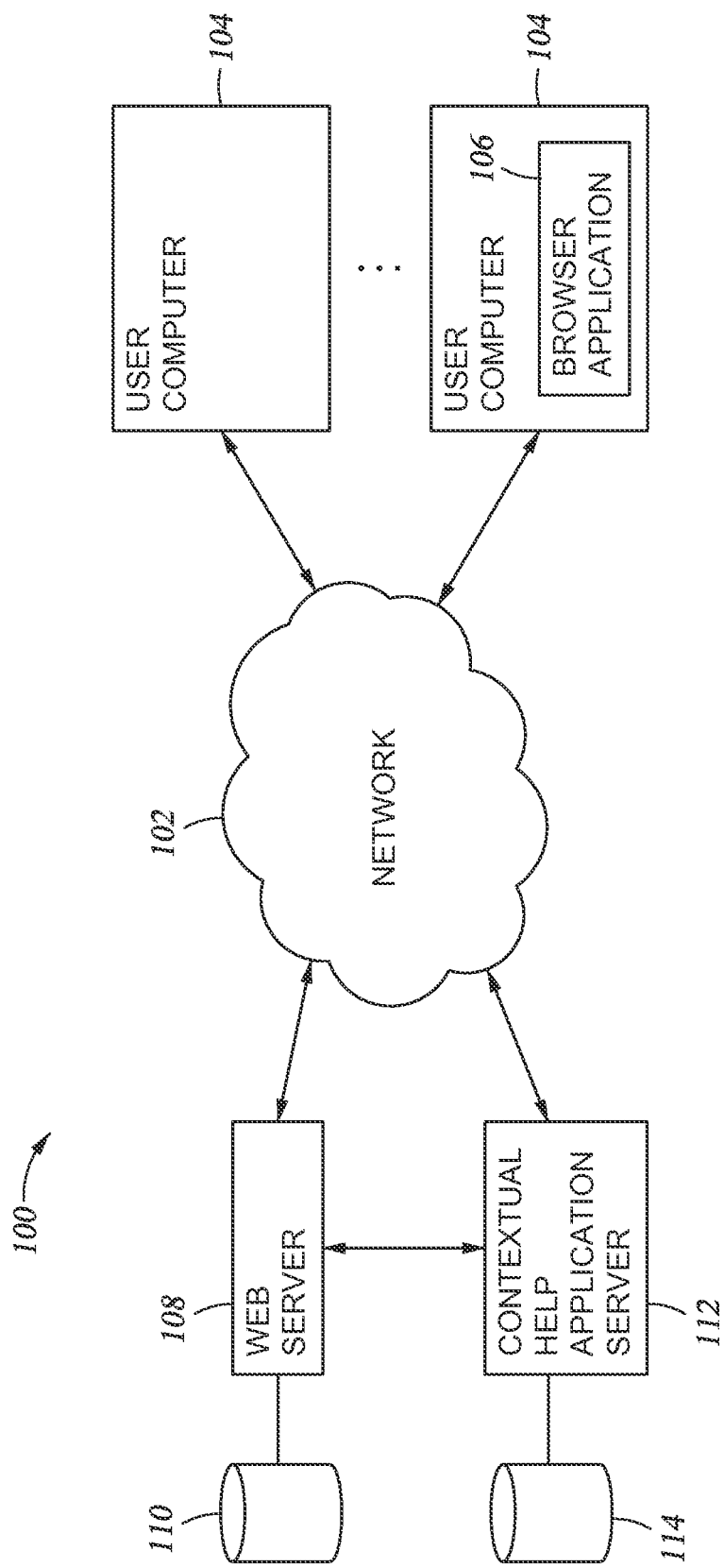
FIG. 1 illustrates a computer system configured for providing a website having a contextual help system.

FIG. 1 illustrates a computer system configured for providing a contextual help application. As shown, the computing system 100 may include a web server 108, a contextual help application server 112, and a plurality of user computers 104 (only two of which are shown for clarity), each connected to a communications network 102 (e.g. the Internet). For example, the web server 108 may be programmed to communicate with the user computers 104 and the contextual help application server 112 using a networking protocol such as TCP/IP protocol. The contextual help application server 112 may communicate directly with the user computers 104 through the communications network 102.

Each user computer 104 may include conventional components of a computing device, e.g., a processor, system memory, a hard disk drive, input devices such as a mouse and a keyboard, and/or output devices such as a monitor, and/or a combination input/output device such as a touch-screen which not only receives input but also displays an output. The web server 108 and the contextual help application server 112 may include a processor and a system memory (not shown), and may be configured to manage web pages and other media content stored in its respective content storage unit 110 and 114 using a file system and/or relational database software. The contextual help application server 112 may be a web server configured to manage help objects and instructions stored in its respective content storage unit 114. The contextual help application server 112 may be configured to receive input from a user and enable the user to learn about and perform various functions within a website utilizing techniques described herein.

In the embodiments described below, users are respectively operating the user computers 104 that may communicate over the network 102 to request webpages and other media content data from the contextual help application server 112. Each user computer 104 may be configured to execute a software application, such as a browser application 106, and access webpages and/or media content data managed by the contextual help application server 112 by specifying a uniform resource locator (URL) for the contextual help application server 112 into the web browser application 106. The webpages that are displayed to a user may be transmitted from the contextual help application server 112 to the user's computer 104 and processed by the web browser application 106 for display through a GUI of the user's computer 104.

A webpage displayed to the user on the user's computer 104 may be the user's own customized website. The user's computer 104 may access the contextual help application server 112 which, in turn, retrieves the user's website from storage 114, and causes the user's website to be shown through the browser 106 on the user's computer 104. The user's website may be managed by the user with a username and password combination, or other similar restricted access/verification required access methods, which allow the user to "log in" and make changes within the website. Changes or alterations made by the user to their website on the user computer 104 may be transmitted through the communications network 102 to the contextual help application server 112. The contextual help application server 112 may transfer the user's website to storage 114 where it may be retrieved and viewed by any other users with access to the Internet. It is contemplated that the webpage displayed may also be any webpage accessed by the user. Thus, the contextual help application described below may be applicable to various types of websites and even software.

It is noted that the user computer 104 may be a personal computer, laptop, mobile computing device, smart phone, video game console, home digital media player, network-connected television, set top box, and/or other computing devices having components suitable for communicating with the communications network 102. The user computer 104 may also execute other software applications configured to receive website building content and contextual help information from the contextual help application server 112, such as, but not limited to, help instructions, media display software, media players, computer and video games, and/or widget platforms.

Figure 2:
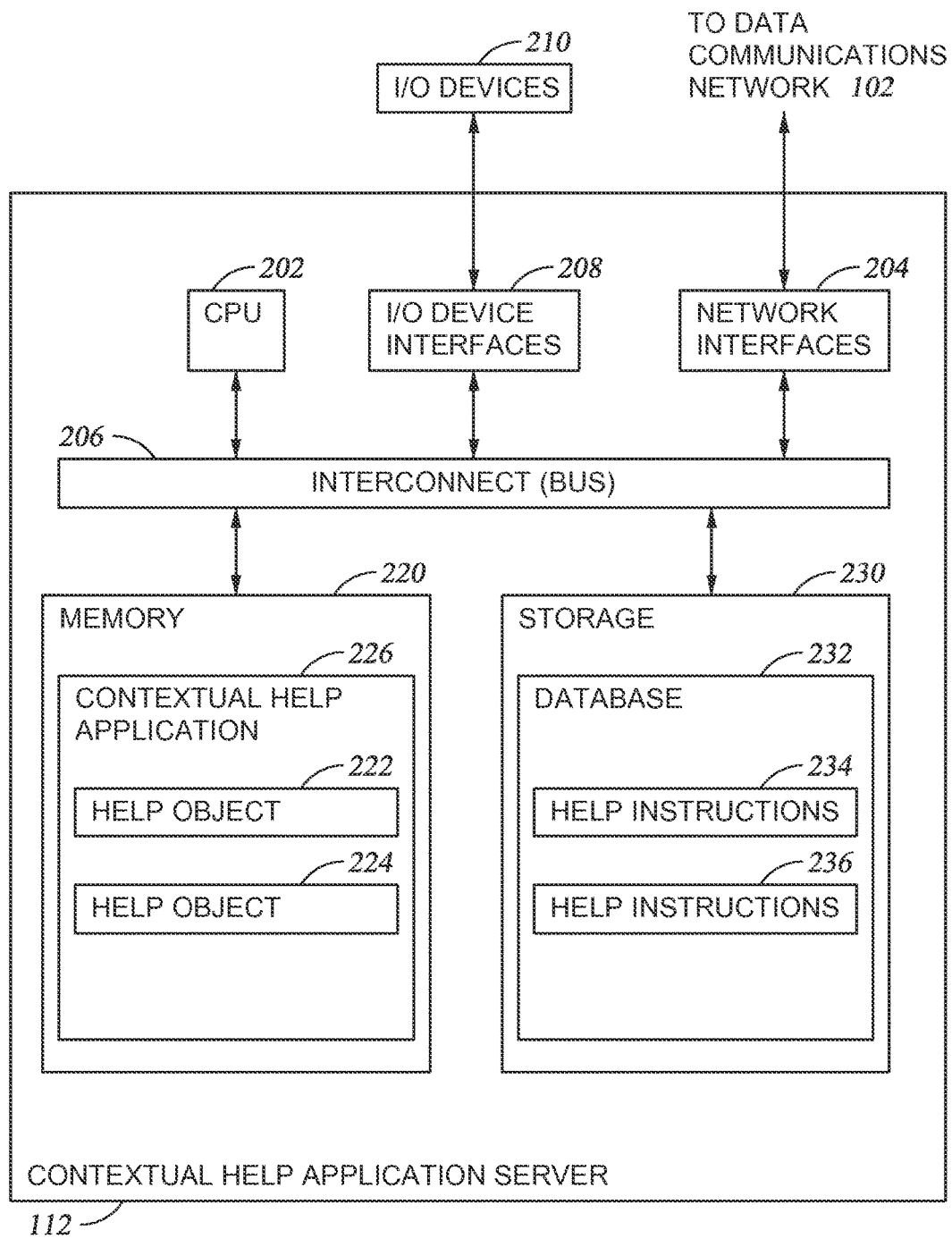
FIG. 2 illustrates a more detailed view of a server of FIG. 1.

FIG. 2 illustrates a more detailed view of a contextual help application server 112 of FIG. 1. The contextual help application server 112 includes, without limitation, a central processing unit (CPU) 202, a network interface 204, memory 220, and storage 230 communicating via an interconnect bus 206. The contextual help application server 112 may also include I/O device interfaces 208 connecting I/O devices 210 (e.g. keyboard, video, mouse, audio, touchscreen, etc). The contextual help application server 112 may further include a network interface 204 configured to transmit data via the communications network 102.

The CPU 202 retrieves and executes programming instruction stored in the memory 220 and generally controls and coordinates operations of other system components. Similarly, the CPU 202 stores and retrieves application data residing in the memory 220. The CPU 202 is included to be representative of a single CPU, multiple CPU's, a single CPU having multiple processing cores, and the like. The interconnect 206 is used to transmit programming instructions and application data between the CPU 202, I/O device interfaces 208, storage 230, network interface 204, and memory 220.

The memory 220 is generally included to be representative of a random access memory and, in operation, stores software applications and data for use by the CPU 202. Although shown as a single unit, the storage 230 may be a combination of fixed and/or removable storage devices, such as fixed disk drives, floppy disk drives, hard disk drives, flash memory storage drives, tape drives, removable memory cards, CD-ROM, DVD-ROM, Blu-Ray, HD-DVD, optical storage, network attached storage (NAS), or a storage area-network (SAN) configured to store non-volatile data.

The memory 220 may store instructions and logic for executing a contextual help application 226. The contextual help application 226 may include one or more dynamic help objects, such as a first help object 222 and second help object 224, among other applications. The storage 230 may store website building content and help instructions and may include a database 232 configured to store data for building a website with associated instructions according to techniques described herein, such as first help instructions 234 and second help instructions 236. The database 232 may also store data relating to help instructions for providing the user with guidance in performing various operations within a website. The database 232 may be any type of storage device.

Figure 3:
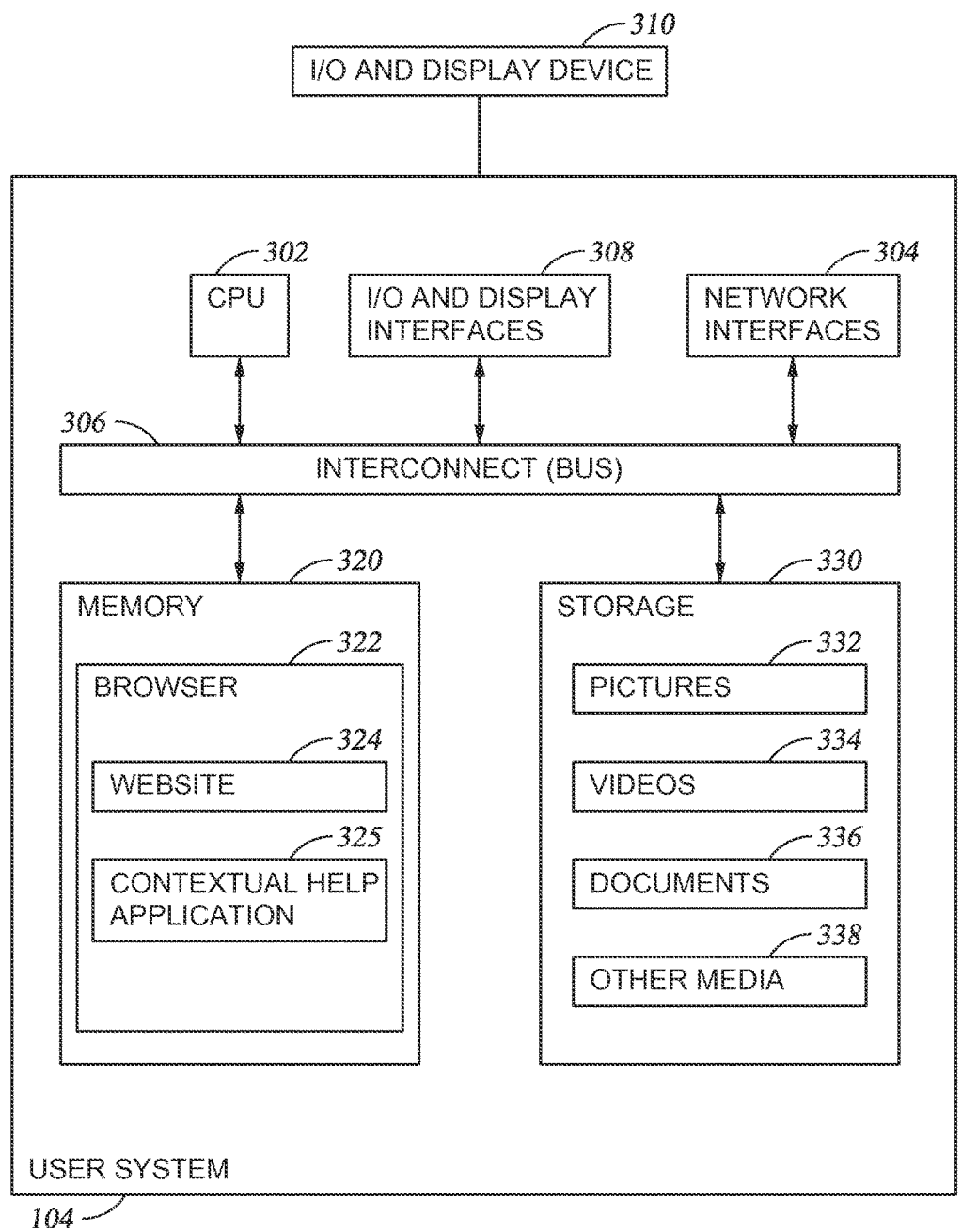
FIG. 3 illustrates a user computing system used to access a website and utilize a contextual help system.

FIG. 3 illustrates a user computing system used to access the contextual help application server within a website, such as the users own website. The user computing system 104 may include, without limitation, a central processing unit (CPU) 302, a network interface 304, an interconnect 306, a memory 320, and storage 330. The computing system 104 may also include an I/O device interface 308 connecting I/O devices 310 (e.g. keyboard, display, touchscreen, and mouse devices) to the computing system 104.

Like CPU 202, CPU 302 is included to be representative of a single CPU, multiple CPU's, a single CPU having multiple processing cores, etc., and the memory 320 is generally included to be representative of a random access memory. The interconnect 306 may be used to transmit programming instructions and application data between the CPU 302, I/O device interfaces 308, storage 330, network interface 304, and memory 320. The network interface 304 may be configured to transmit data via the communications network 102, e.g. to stream content from the contextual help application server 112, as well as to receive and present the user's website with associated help instructions. Storage 330, such as a hard disk drive or solid-state storage drive (SSD), may store non-volatile data. The storage 330 may contain pictures 332, videos 334, documents 336, and other media 338 which can be any type of media that may be published to a website. Illustratively, the memory 320 may include a browser 322, which itself displays a website 324, and a contextual help application 325. The browser 322 may provide a software application which allows the user to access web pages and other content hosted by the contextual help application server 112. The browser 322 may also allow any user of the user computer system 104 to access any website available on the Internet.

Figure 4:
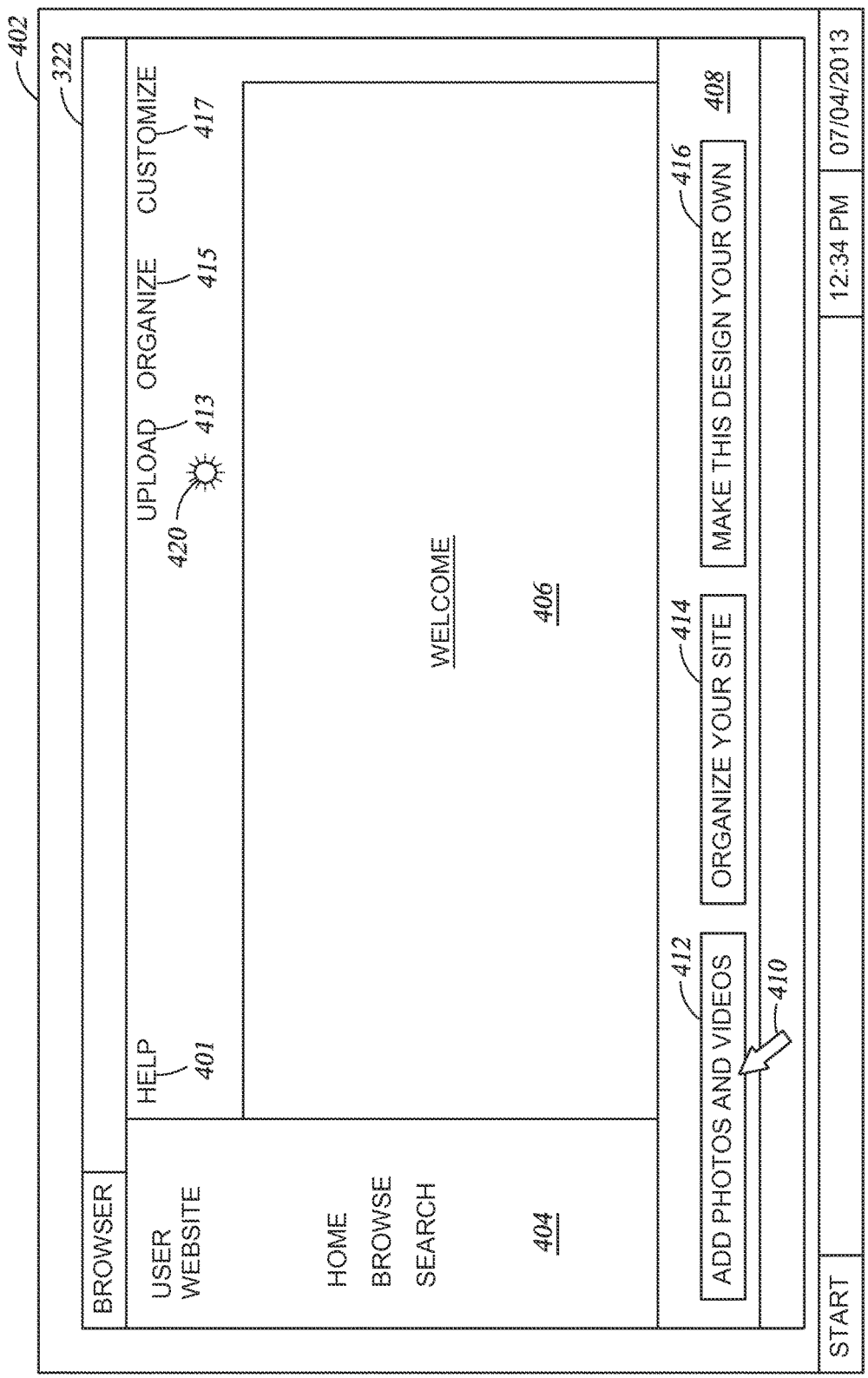
FIG. 4 illustrates a graphical user interface displaying a contextual help application having a first object selected.

FIG. 4 illustrates a GUI 402 displaying a contextual help application 408 having a first object 412 highlighted. The GUI 402, such as a monitor or I/O device described above, may display to a user a website 404 within the browser 322. The website 404 may be user user's own website or a different website incorporating the contextual help application 408. Although shown and described with relation to a website for the sake of clarity, it is contemplated that the embodiments described herein may be applicable to any type of software or computer program. As depicted, the website 404 may provide the user with various selections, such as a home selection, browse selection, and search selection, among others. It is contemplated that the selections shown are provided as examples and are not intended to be limiting. Content 406 may be displayed within the website 404. The content 406 may be any type of content typically shown in a website. The content 406 depicted in FIG. 4 may be content displayed in the user's own customized website 404.

If a user is attempting to use, build, manage, update, or alter the website 404, the user may require help to perform their desired operations. The contextual help application 408 may be provided to assist the user in performing various functions within the website 404. The contextual help application 408 may be provided automatically by the website 404 or may be summoned with input provided by the user, such as by selecting the help selection 401. The contextual help application 408 may be displayed in any convenient location within the website 404. For the sake of clarity, the website 404 is shown as being maximized to occupy the entire browser 322. However, it is contemplated that the website 404 may occupy various portions of the browser 322 depending on the user's preferences. The contextual help application 408 may appear in a layer above the website 404 and/or content 406 or may be provided integrally within the website 404 and/or content 406. However, the contextual help application 408 does not require a separate browser 322 window to be displayed.

The contextual help application 408 may dynamically provide one or more help objects, such as a first help object 412, a second help object 414, and a third help object 416. Although three help objects 412, 414, 416 are shown, more or less help objects may be provided by the contextual help application 408 depending upon the content 406 displayed within the website 404. As mentioned above, dynamic provision of help objects may be performed by the contextual help application 408. The contextual help application 408 may analyze the content 406 to determine what types or categories of operations the user may desire to perform in relation to the displayed content. The categories of content displayed may be separate and distinct from the contextual help application 408. As shown, the content 406 may be a homepage and the user may be initially designing the website 404. Thus, the contextual help application 408 may provide help objects 412, 414, 416 that correlate to building and designing the website 404.

The first help object 412 is provided to help the user add photos and videos to the website 404 which may correlate to an upload selection 413. The second help object 414 is provided to help the user organize the website 404 which may correlate to an organize selection 415. The third help object 416 is provided to help the user customize the design of the website 404 which may correlate to a customize selection 417. The types of help provided by the help objects 412, 414, 416 are provided as examples of the type of dynamic help that may be provided by the contextual help application 408, but is not intended to be limiting. The user may utilize an input object, such as a cursor 410 or the like, to select the type of help the user desires.

The contextual help application 408 may determine the location of the cursor 410 within the GUI 402. When the contextual help application 408 determines that the cursor 410 is located over one of the one or more help objects 412, 414, 416, an indication object 420 may be displayed. The indication object 420 may be any visibly discernible signal which assists the user in making a selection to perform the desire operation within the website 404. The indication object 420 may continue to be displayed so long as the cursor 410 remains over and portion of one of the help objects 412, 414, 416. As shown, the cursor 410 is located over the first help object 412 and the indication object 420 is simultaneously displayed in a location correlating to the type of help provided by the first help object 412. For example, the indication object 420 appears near the upload selection 413. The upload selection 413 corresponds to the first help object 412 and may contain instructions for adding photos and videos to the website 404. Thus, the indication object 420 directs the user an area of the website where the function of the first help object 412 may be performed. If the user moves the cursor 410 away from the first help object 412, the indication object 420 may disappear.

If the user provides input selecting the upload selection 413, the indication object 402 may disappear. However, instructions included within the upload selection 413 may assist the user in performing the desired function. Alternatively, the indication object 420 may remain displayed in the website 404 and may navigate the user through instructions provided by the upload selection 413. Instruction for performing a desired operation may also be provided by the contextual help application 408. For example, the user may provide input by utilizing the cursor 410 to select the first help object 412 which may cause the contextual help application 408 to display the correlating instructions without the user following the guidance of the indication object 420.

Figure 5:
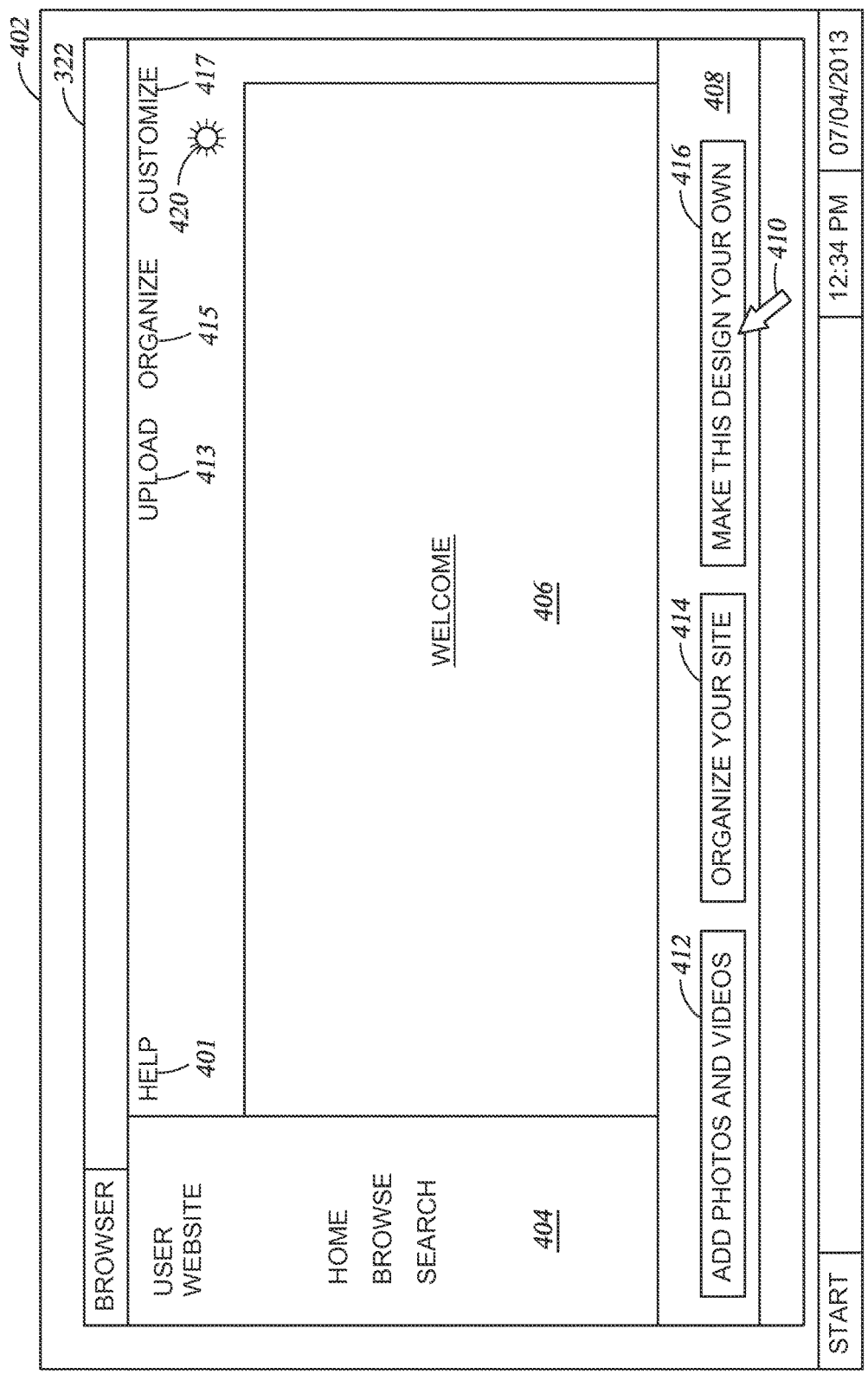
FIG. 5 illustrates the graphical user interface of FIG. 4 displaying a contextual help application having a second object selected.

FIG. 5 illustrates the GUI 402 of FIG. 4 displaying a contextual help application 408 having a different help object selected. As depicted in FIG. 5, the cursor 410 is provided by the user over the third help object 416. The contextual help application 408 may determine the location of the cursor 410 and simultaneously display the indication object 420. In this example, the indication object 420 is displayed to guide the user to the customize selection 417 which correlates to the third help object 416.

Figure 6:
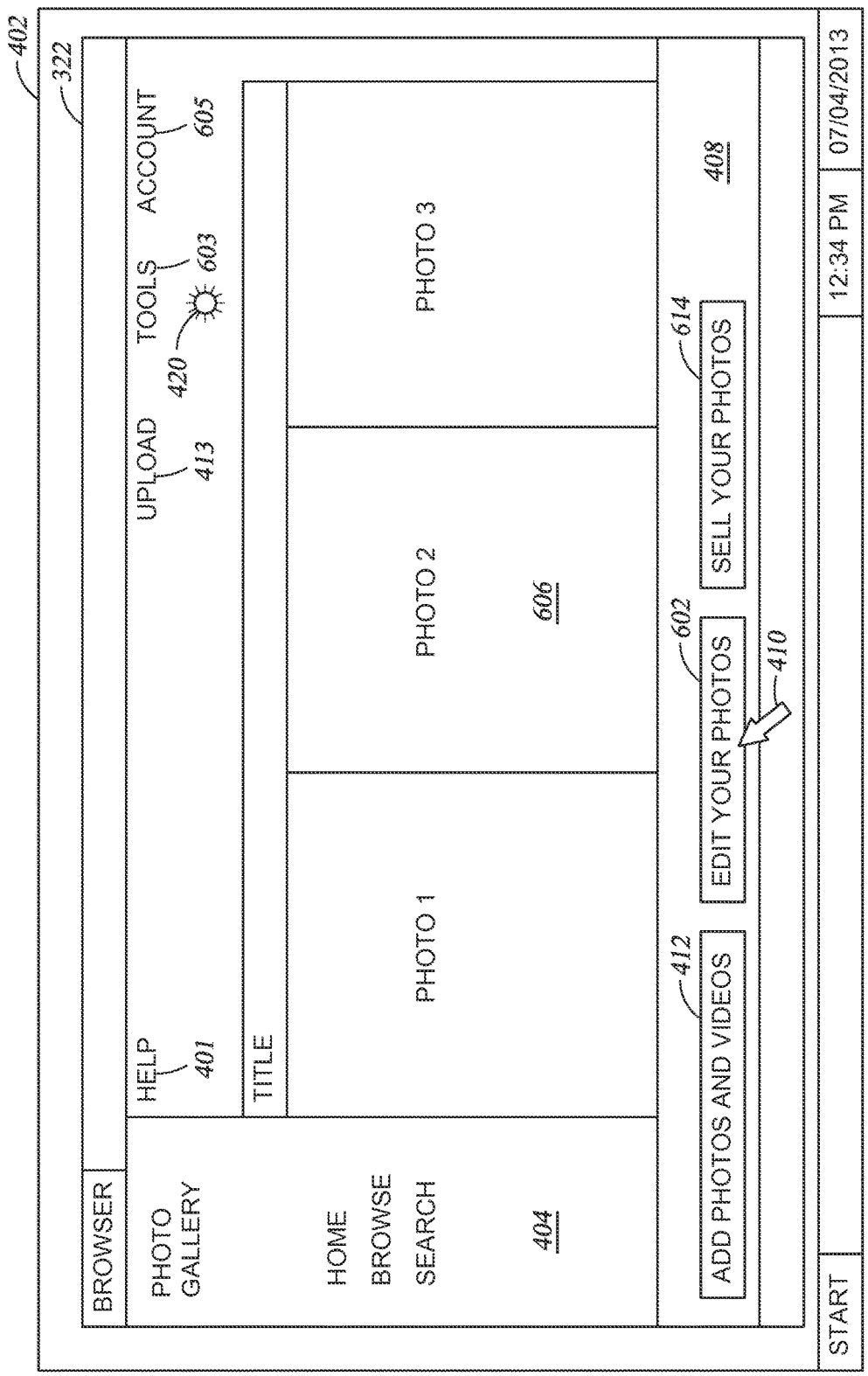
FIG. 6 illustrates a graphical user interface displaying content different than the content displayed in FIG. 4 or FIG. 5.

FIG. 6 illustrates the GUI 402 displaying content 606 different than the content 402 displayed in FIG. 4 or FIG. 5. The website 404 may be substantially similar to the website 404 of FIG. 4 or FIG. 5 but the content 606 may be unique to the page within the website 404 currently displayed by the browser 322. The dynamic characteristics of the contextual help application 408 may select the types of help object 412, 602, 604 based on categories of content 606 displayed within the website 404. For example, the website 404 may display photo gallery content 606. In this example, the first help object 412 may be applicable to both categories of content 406, 606. The user may desire to upload photos or videos to a homepage (See FIG. 4 and FIG. 5) and the user may desire to upload photos to a photo gallery (See FIG. 6).

However, the contextual help application 408 may determine that the type of content 606 requires additional types of help. Thus, a fourth help object 602 and a fifth help object 604 may be provided. The fourth help object 602 may help the user edit photos contained within the content 606 which may correlate to a tools selection 603. The fifth help object 604 may help the user sell their photos to prospective buyers or clients displayed as content 606 which may correlate to an account selection 605.

As depicted in FIG. 6, the user may provide the cursor 410 over the fourth help selection 602 and the contextual help application 408 may simultaneously cause the indication object 420 to be displayed by the correlating selection, the tools selection 603. If the user were to move the cursor 410 over any portion of the fifth help selection 604, the contextual help application 408 would cause the indication object 420 to display near the account selection 605. Thus, the user may receive instructions and assistance germane to the content 606 displayed. It is contemplated the examples provided are simplified for ease of illustration and the types of help and content displayed may be infinite. However, the contextual help application 408 may continually analyze the content 606 and provide relevant help objects that allow the user to efficiently accomplish desired functions.

Figure 7:
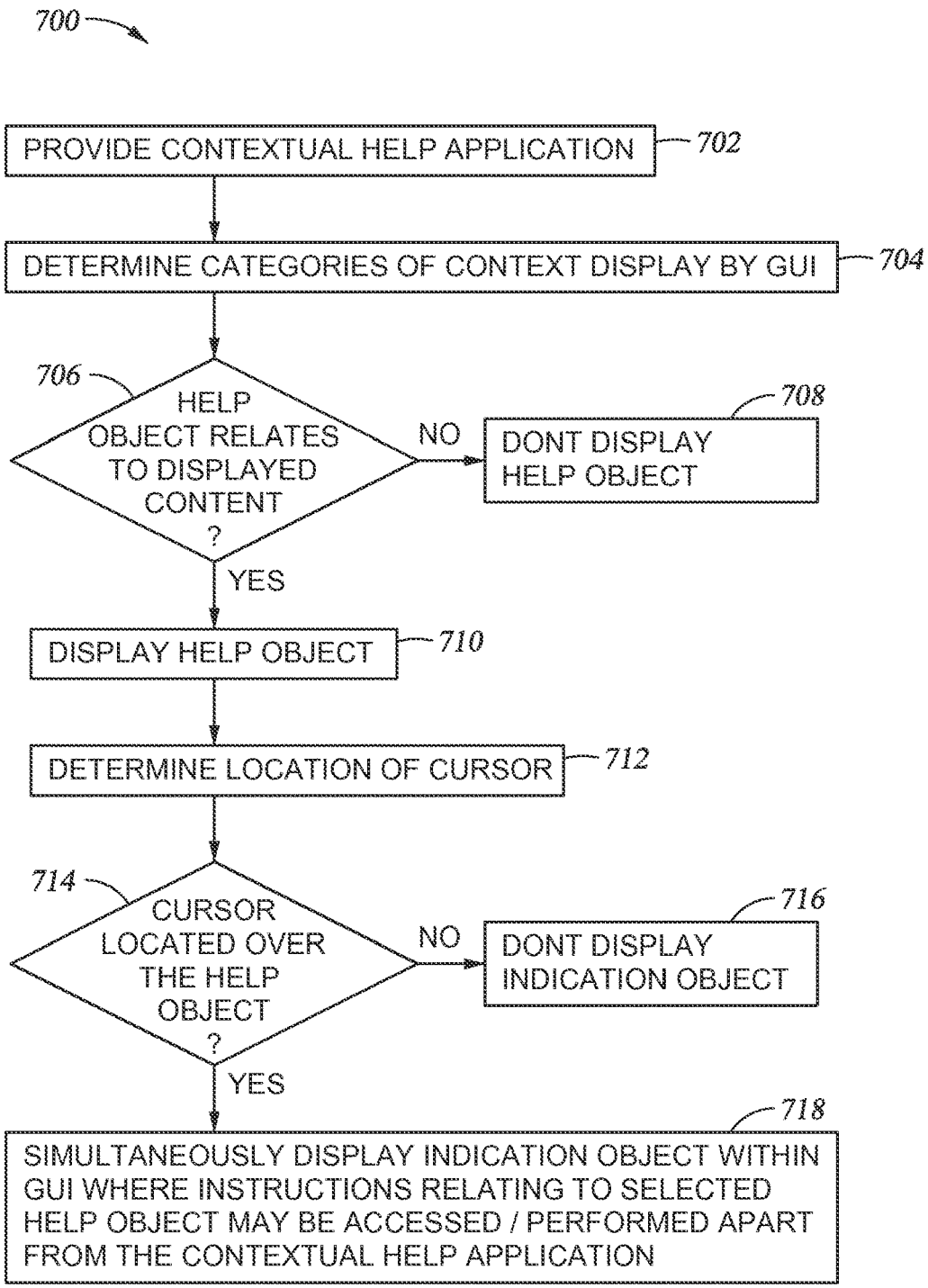
FIG. 7 illustrates a schematic flow chart depicting a contextual help application receiving input and displaying help instructions.

FIG. 7 is a schematic flow chart 700 depicting a contextual help application receiving input and displaying help instructions. At operation 702, the contextual help application may be provided. At operation 704, the contextual help application may determine categories or types of content displayed by a GUI. Thus, the contextual help application may be dynamic in that the types of help objects provided are always relevant to the type of content displayed in the GUI. At operation 706, the contextual help application determines if a help object relates to the content displayed. If the answer is no, the contextual help application does not display the help object at operation 708. If the answer is yes, the contextual help application displays the help object at operation 710.

At operation 712, the contextual help application may determine a location of selection indicator, such as a cursor. At operation 714, the contextual help application determines whether the cursor is located over any portion of the help object. If the cursor is not located over the help object, an indication object will not be displayed at operation 716. If the cursor is located over the help object, an indication object will be simultaneously displayed within the GUI where instructions relating to the selected help object may be accessed or performed apart from the contextual help application at operation 718.

The contextual help application described in the embodiments above may enable a user to more effectively and efficiently utilize and perform various functions or capabilities provided to the user by a computer program, software program, or website. For example, software for word processing programs, spreadsheet programs, and presentation creating programs may also benefit from the embodiments described herein. By providing dynamic guidance based upon the type of content displayed to a user and simultaneously providing an indication to guide the user in performing a desired operation, the user is able quickly perform a desired operation with ease. The user may learn from the guidance provided by the contextual help application and may be able to perform a desired function without help in the future. Additionally, the user may learn about capabilities of the programs, software, or website previously unknown to the user, thus allowing the user to realize the full potential of the computer program, software, or website.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

The invention claimed is:

1. A method of providing dynamic contextual help to a user, comprising:
    displaying a category of content on a graphical user interface;
    analyzing content displayed by the graphical user interface to determine categories or types of content displayed;
    displaying a contextual help application on the graphical user interface separately from the displayed content, the contextual help application displayed in response to the determined category or type of the displayed content;
    automatically displaying one or more specific help objects in the contextual help application correlating to the analyzed categories or types of content displayed by the graphic user interface and changing the one or more specific help objects displayed in the contextual help application in response to a change in display of the categories or types of content;
    receiving input selecting a first specific help object and simultaneously displaying an indication object near a first function displayed on the graphical user interface;
    receiving input selecting a second specific help object and concurrently moving the indication object from the first function to a second function displayed on the graphical user interface, wherein the first function and the second function correspond to the first specific help object and the second specific help object, respectively;
    receiving input selecting one or both of the first function and the second function; and
    performing the selected function separately from the contextual help application displayed on the graphical user interface.

2. The method of claim 1, further comprising detecting a location of a cursor over the first specific help object within the contextual help application.

3. The method of claim 2, further comprising detecting a location of the cursor over the second specific help object within the graphical user interface.

4. A non-transitory computer-readable storage medium, storing instructions that when executed by a processor, cause the processor to provide dynamic contextual help, by performing the steps of:
    displaying a category of content on a graphical user interface;
    analyzing content displayed by the graphic user interface to determine categories or types of content displayed;
    displaying a contextual help application on the graphical user interface separately from the displayed content, the contextual help application displayed in response to the determined category or type of the displayed content;
    automatically displaying one or more specific help objects in the contextual help application correlating to the analyzed categories or types of content displayed by the graphic user interface and changing the one or more specific help objects displayed in the contextual help application in response to a change in display of the categories or types of content;
    receiving input selecting a first specific help object and simultaneously displaying an indication object near a first function displayed on the graphical user interface;
    receiving input selecting a second specific help object and concurrently moving the indication object from the first function to a second function displayed on the graphical user interface, wherein the first function and the second function correspond to the first specific help object and the second specific help object, respectively;
    receiving input selecting one or both of the first function and the second function; and
    performing the selected function separately from the contextual help application displayed on the graphical user interface.

5. The non-transitory computer-readable storage medium of claim 4, further comprising detecting a location of a cursor over the first specific help object within the contextual help application.

6. The non-transitory computer-readable storage medium of claim 5, further comprising detecting a location of the cursor over the second specific help object within the graphical user interface.

7. A computer system for providing dynamic contextual help, comprising:
    a processor; and
    a memory storing instructions that, when executed by the processor, cause the computer system to:
    display a category of content on a graphical user interface;
    analyze content displayed by the graphical user interface to determine categories or types of content displayed;
    display a contextual help application on the graphical user interface separately from the displayed content, the contextual help application displayed in response to the determined category or type of displayed content;
    automatically display one or more specific help objects in the contextual help application correlating to the analyzed categories or types of content displayed by the graphic user interface and changing the one or more specific help objects displayed in the contextual help application in response to a change in display of the categories or types of content;

receive input selecting a first specific help object and simultaneously displaying an indication object near a first function displayed on the graphical user interface;

receive input selecting a second specific help object and concurrently moving the indication object from the first function to a second function displayed on the graphical user interface, wherein the first function and the second function correspond to the first specific help object and the second specific help object, respectively;

receive input selecting one or both of the first function and the second function; and perform the selected function separately from the contextual help application displayed on the graphical user interface.

8. The computer system of claim 7, further comprising detecting a location of a cursor over the first specific help object within the contextual help application.

9. The computer system of claim 8, further comprising detecting a location of the cursor over the second specific help object within the graphical user interface.

* * * * *